United States Patent Office 3,212,684
Patented Oct. 19, 1965

3,212,684
ARRANGEMENT FOR A GREASE PUMP
Bengt Gustaf Ingvar Svensson, Sven Adolf Igelström, and Eric-Gustaf Wirén, Lindesberg, Sweden, assignors to A/B Fabriken Orion, Erik Wirén & Son, Lindesberg, Sweden, a joint-stock company of Sweden
Filed June 15, 1964, Ser. No. 375,125
Claims priority, application Sweden, July 3, 1963, 7,409/63
6 Claims. (Cl. 222—326)

This invention relates to a grease pump of the type comprising a casing, a low-pressure part, into which the grease is loaded and from where it is advanced by a spring-loaded piston, usually in the form of a rubber sleeve, to a high-pressure cylinder from which a high-pressure piston presses the grease further to the point of lubrication. The grease is loaded in unpacked state by hand or by pump, or in packed state by inserting grease containers in the form of cardboard or sheet metal tubes.

Previously known sleeves, for being adapted to be used both for filling grease into the casing and for inserting a grease tube, had in the latter case to be forced into the smaller diameter of the tube compared with that of the casing by means of outward expedients, for example a bead on the magazine casing.

Contrary thereto, in the arrangement according to the invention the sleeve comprises a bottom plate and an annular flange conically widening with a positive angle in the feeding direction of the grease, and the flange in its portion farthest to the front is shaped invertedly conical, that is with a negative angle, thus rendering possible sealing between the sleeve and the inner diameter of the pump casing in spite of the alteration of the latter caused by the insertion of a grease tube.

Figure 1:
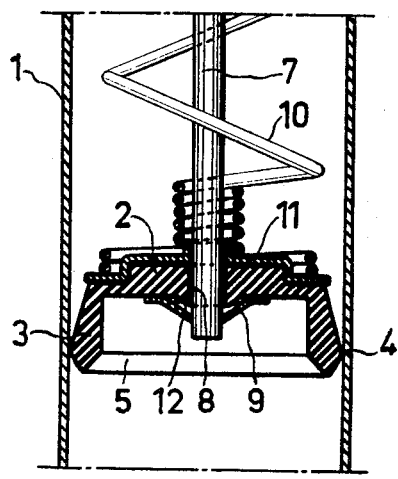
Figure 2:
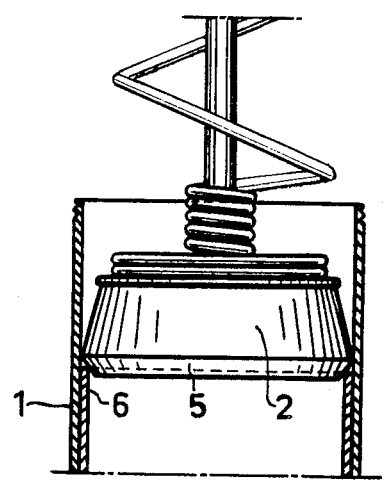
Figure 3:
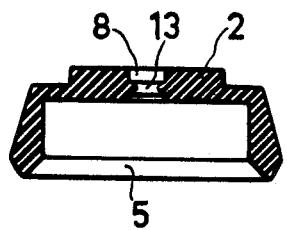

An embodiment of the invention will now be described by way of example with reference to the accompanying drawing in which:

FIGURE 1 is a sectional view of a sleeve inserted into the casing of a grease pump, FIGURE 2 shows the same sleeve when it is inserted into a grease tube placed in the casing, and FIGURE 3 shows a section through a sleeve with changed centre hole, FIGURE 1 shows a casing 1 of a grease pump with a sleeve running therein, which sleeve comprises a bottom plate 2 and an annular flange 3 projecting therefrom. The annular flange 3 is shaped such that it widens conically with a positive angle and abuts at its greatest diameter 4 against the inner surface of casing 1. The flange 3 has as its part farthest to the front a portion 5 with a negative angle, rendering it possible, as shown in FIGURE 2, to insert the sleeve into the casing 1 in spite of the fact, that the inner diameter of the latter is reduced by the insertion of a grease tube 6 therein. As appears clearly from this figure, the sleeve portion 5 with negative angle abuts against the edge of the grease tube 6 and thus forces the sleeve in a simple way into the grease tube.

The sleeve is guided by a piston rod 7 running through a centre hole 8 in the bottom plate 2 and is retained on the rod 7 by a locking washer 9 against which it is pressed by a spring 10. A washer 11 disposed between the spring 10 and bottom plate 2 is provided with an elevation wherein a corresponding elevation in the bottom plate 2 is held, thereby giving the sleeve satisfactory guidance. In order to obtain satisfactory sealing of the centre hole 8, even when the sleeve is in an oblique position, the hole 8 is provided at one side of the bottom plate with a lip 12 from which the hole widens conically, either uniformly or by steps. An alternative embodiment of the hole 8 is shown in FIGURE 3 where it is given the shape of an edge tapering to a bead 13, its shape being preferably that of an O-ring. In order to reduce or eliminate entirely the oblique position of the sleeve, the piston rod with the sleeve should run vertically, which is preferably effected by a suitable locking means (not shown), for example of the type described in Swedish patent application 6,198/60.

The sleeve is made of a resilient elastic material, for example of synthetic rubber having suitable hardness, preferably 55 to 70° Shore. The bottom plate 2 may have uniform thickness of material, but the embodiment shown is to be preferred, because it provides better stability of the bottom plate. The portion of the sleeve flange 3 having a positive angle must have a certain minimum length, at least one fifth of the diameter of casing 1. The negative angle of the portion 5 may vary, but the principle is that the edge of the tube 6 must strike somewhere against the portion 5 when the sleeve is being inserted into the tube. The greatest outer diameter of the sleeve, in relation to the inner diameter of the tube may have a tolerance of from —0.35 to +0.25 mm. For effecting sufficient spring action of the sleeve so that sealing in the casing 1 and the tube 6 is obtained, and in order to prevent at the same time the sleeve from changing under pressure, for example by formation of folds, it is necessary that the thickness of the material of the annular flange 3 increases from the bottom plate 2 towards the greatest diameter 4. This is obtained by giving the internal edge of the annular flange a substantially cylindrical shape, whereby the greatest material thickness is obtained in the desired point.

As appears from the description and drawing, the construction according to the invention provides the effect that for the first time the same sleeve can be employed in a grease pump and renders satisfactory sealing by abutment in casings and tubes with different inner diameters. It is, thus, possible to use the same grease pump, without adjusting or changing its components and without providing external auxiliary means, both for filling by hand, by pump or by inserting a grease tube.

What we claim is:

1. A grease gun comprising a cylindrical casing, a sleeve of resilient elastic material slidably mounted in the casing for forcing the grease through the casing and through a grease cartridge inserted in the casing, and a spring loaded piston rod adapted to support the sleeve, said sleeve comprising a substantially cup-shaped integral packing collar having a circular bottom plate with a center hole through which the piston rod sealingly extends and an annular flange projecting therefrom in the feeding direction of the sleeve, the inner surface of the sleeve being substantially cylindrical and the outer surface of said flange having a first flat frusto conical portion with its narrow end adjacent to said bottom plate and its wider end engaging the casing and the cartridge and a second flat fruston conical portion with its wider end connected to the wider end of said first frusto conical portion and its narrow end separated from the casing and cartridge, thus rendering the sleeve capable of penetrating sealingly both into the pump casing and into the grease cartridge inserted therein.

2. A grease pump comprising a cylindrical casing, a sleeve of resilient elastic material slidably mounted in said casing and a spring loaded piston rod connected to said sleeve, said sleeve comprising a circular bottom plate and an annular flange projecting therefrom, the outer surface of said flange having a first frusto conical portion with its narrow end adjacent to said bottom plate and a second frusto conical portion with its wider end connected to the wider end of said first frusto conical portion, said circular bottom plate having a frusto conical center hole having an inwardly extending lip at the narrower end thereof.

3. A grease pump comprising a cylindrical casing, a sleeve of resilient elastic material slidably mounted in said casing and a spring loaded piston rod connected to said sleeve, said sleeve comprising a circular bottom plate and an annular flange projecting therefrom, the outer surface of said flange having a first frusto conical portion with its narrow end adjacent to said bottom plate and a second frusto conical portion with its wider end connected to the wider end of said first frusto conical portion, said circular bottom plate having a substantially cylindrical center hole having an inwardly extending ridge intermediate its ends.

4. A grease pump as defined in claim 1 in which said sleeve consists of synthetic rubber having a hardness of 55–70° Shore.

5. A grease pump as defined in claim 1 in which the height of said first frusto conical outer surface is at least one-fifth of the inner diameter of said casing.

6. A grease pump as defined in claim 1 in which the maximum normal diameter of said sleeve is within the range from 0.35 mm. smaller to 0.25 mm. larger than the inner diameter of said casing.

References Cited by the Examiner
UNITED STATES PATENTS

| | | | |
|---|---|---|---|
| 1,828,479 | 10/31 | Spring | 222—385 |
| 2,886,215 | 5/59 | Klein | 222—340 X |
| 2,902,190 | 9/59 | Hosler | 222—327 X |

LOUIS J. DEMBO, *Primary Examiner.*